United States Patent
Shoolman

(10) Patent No.: US 8,493,194 B1
(45) Date of Patent: Jul. 23, 2013

(54) BICYCLE ELECTRONIC SIGNALING DEVICE THAT SOUNDS LIKE A CAR HORN

(76) Inventor: Carl Shoolman, Columbus, OH (US)

( * ) Notice: Subject to any disclaimer, the term of this patent is extended or adjusted under 35 U.S.C. 154(b) by 0 days.

(21) Appl. No.: 13/233,988

(22) Filed: Sep. 15, 2011

(51) Int. Cl.
- *B62J 3/00* (2006.01)
- *G08B 3/00* (2006.01)
- *G08B 25/08* (2006.01)
- *G08B 23/00* (2006.01)

(52) U.S. Cl.
USPC ..... 340/432; 340/691.1; 340/692; 340/693.5; 340/693.9

(58) Field of Classification Search
USPC ............ 340/432, 691.1, 692, 693.5, 693.9
See application file for complete search history.

(56) References Cited

U.S. PATENT DOCUMENTS

| | | | |
|---|---|---|---|
| 955,192 | A | 4/1910 | Palous |
| 293,540 | A | 10/1954 | Ruben |
| 4,222,040 | A | 9/1980 | Benson |
| 5,049,853 | A * | 9/1991 | Yoon ..................... 340/384.73 |
| 5,083,108 | A | 1/1992 | Guest |
| 5,262,757 | A | 11/1993 | Hansen |
| 5,617,303 | A * | 4/1997 | Izzo, Sr. .................... 362/473 |
| 6,002,324 | A | 12/1999 | Solow |
| D568,195 | S | 5/2008 | Solow |
| 7,394,351 | B2 | 7/2008 | Solow |
| 8,004,390 | B2 | 8/2011 | Solow |
| 2008/0072697 | A1 * | 3/2008 | Fujii ........................... 74/471 R |
| 2008/0084282 | A1 | 4/2008 | Solow |
| 2008/0258883 | A1 * | 10/2008 | Solow ........................ 340/388.1 |
| 2009/0267276 | A1 * | 10/2009 | Sugimoto et al. ............... 267/75 |
| 2010/0096951 | A1 | 4/2010 | Yamada ........................ 310/340 |
| 2011/0260686 | A1 * | 10/2011 | Ford .............................. 320/110 |
| 2011/0268306 | A1 | 11/2011 | Solow |

OTHER PUBLICATIONS

Wikipedia. "Vehicle horn, Horn types, Automobile" Accessed Aug. 14, 2011.
Feb. 14, 1997 web advertisement for Wolo Electric Horn Model 260. Wolo Manufacturing Corp. Preserved on Web Archive. http://web.archive.org/web/19970214110300/http://www.wolo-mfg.com/elec.htm Accessed Sep. 14, 2011.
Wikipedia, "List battery sizes, Common consumer batteries: Round batteries." Accessed Sep. 12, 2011.
Wikipedia, "Alkaline Battery, Capacity." Accessed Sep. 12, 2011.
Radio Shack' On-line Battery Guidebook, "Choosing the Right Battery: Capacity." http://support.radioshack.com/support_tutorials/batteries/batgd-B04.htm Accessed Sep. 13, 2011.
Forum discussion on Bike Pittsburgh, "I want a loud car horn on my bike." Posts #1, 11, http://bike-pgh.org/bbpress/topic/i-want-a-loud-car-horn-on-my-bike#post-77872 Accessed Sep. 1, 2011.
Instructables. "Putting a Car Horn on Your Bicycle!" Quotes from comments dated May 10, 2009. Published Oct. 19, 2008. http://www.instructables.com/id/Putting-A-Car-Horn-On-Your-Bicycle/ Accessed Aug. 14, 2011.
"How I wired a car horn on my bicycle." 8,693 views. http://www.youtube.com/watch?v=0cmXXWKvNE4 Accessed Sep. 14, 2011.

(Continued)

*Primary Examiner* — Benjamin C Lee
*Assistant Examiner* — Christopher Gaines
(74) *Attorney, Agent, or Firm* — The Law Office of Patrick F. O'Reilly III, LLC

(57) ABSTRACT

One embodiment is a warning system for bicycles that sounds like a car horn and weighs less than a pound. The batteries are size AAA.

15 Claims, 3 Drawing Sheets

OTHER PUBLICATIONS

Figure 1:
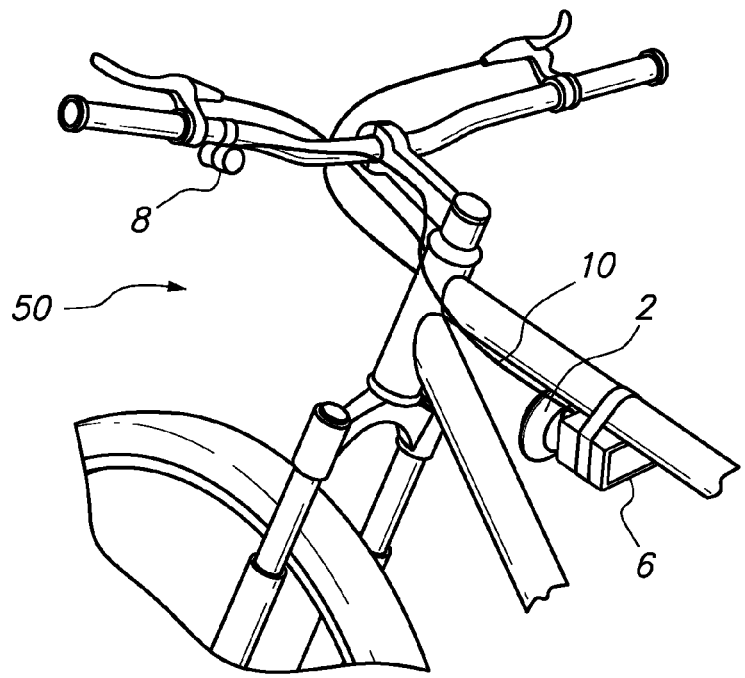

Thunder Horn with 6 Sound Effects (2nd Gen) http://gadget.brando.com/thunder-horn-with-6-sound-effects-2nd-gen-__p01693c049d001.html. Accessed Sep. 14, 2011.

"Anone use a car horn??" Bike forum. Nov. 2005. http://www.bikeforums.net/archive/index.php/t-152052.html Accessed Aug. 14, 2011.

"Car horn Installation." Bike forum. Dec. 2007 http://www.bikeforums.net/archive/index.php/t-370869.html Accessed Aug. 14, 2011.

"Best, smallest, and loudest electronic horn." Bike forum. Nov. 2007-Dec. 2008. http://www.bikeforums.net/archive/index.php/t-360349.html Accessed Sep. 8, 2011.

"Can you run a horn from light batteries?" Bike forum. Feb. 3, 2009 http://www.bikeforum.net/archive/index.php/t-511920.html Accessed Aug. 14, 2011.

"Total Geekiness" Bike Forum. Dec. 2003-Jan. 2004. http://www.bikeforums.net/archive/index.php/t-42629-p-21.html Accessed Sep. 8, 2011.

"Air Horns." Bike Forum. Sep. 2006-Jan. 2007 http://bikeportland.org/forum/showthread.php?s=87a95bb1c983ca504c87a5d08b1e3a04&t=467&page=3 Accessed Sep. 14, 2011.

"Car Horn for Bicycle." Felipe La Rotta, Jan. 1, 2010. http://engallamientos.wordpress.com/2010/01/11/car-horn-on-bicycle/ Accessed Sep. 14, 2011.

"Just installed a car horn on my 60's Schwinn American." May 2009 http://www.ratrodbikes.com/forum/viewtopic.php?f=1&p=160433&st=0&sd=a Accessed Sep. 14, 2011, (No update on whether it worked on first ride.).

"Man installs car horn on his bicycle." Nov. 2010. http://autogigolo.wordpress.com/2010/11/09/man-installs-car-horn-on-his-bicycle/ Accessed Sep. 1, 2011.

"Car horn on bicycle WITH RELAYS." Video. Sep. 2010 http://www.youtube.com/watch?v=dAYtZr_vw6Q Accessed Sep. 15, 2011.

"Car horn on bike." Video. May 2008. http://www.youtube.com/watch?v=sEOOyaQhWZI Accessed Sep. 15, 2011.

"Multiple Demos of my Bicycle Horn (Car Horn)" Video May 2008 http://www.youtube.com/watch?v=CTolpTugILs Accessed Sep. 15, 2011.

"Car Horn Bicycle Ride By." Video Aug. 2008. http://www.youtube.com/watch?v=WxVPDMQlzXY Accessed Sep. 15, 2011.

"Car horns installed on a bicycle ." Video 22/2008. http://www.youtube.com/watch?v=Crlkli7onhc Accessed Sep. 15, 2011.

"Car horns on my mountain bike" Video Jul. 2010. http://www.youtube.com/watch?v=SwE2oiKW95A Accessed Sep. 15, 2011.

"Car horn on an electric bicycle," Video Aug. 2011. http://www.youtube.com/watch?v=wrB8r2v15jE Accessed Sep. 15, 2011.

"Anoying people with a car horn on my bicycle." Video May 2008. http://www.youtube.com/watch?v=Vm6HoOOous4 Accessed Sep. 15, 2011.

"Lowrider bike with Car horn and more ," Video Sep. 2010. http://www.youtube.com/watch?v=szWQzYK6bA Accessed Sep. 15, 2011.

"Car horn on my biker!" Video Jun. 2010 http://www.youtube.com/watch?v=y9M6eTjrFwQ Accessed Sep. 15, 2011.

"Car horn on my bicycle." Video Feb. 2009. http://www.youtube.com/watch?v=siEKkh8wks4 Accessed Sep. 15, 2011.

"Magnum Car horn ride by " Video Dec. 2008, http://www.youtube.com./watch?v=o_nzJjJOiw Accessed Sep. 15, 2011.

"Car Horns Installed on a Bicycle." Video May 2011. http://www.youtube.com/watch?v=Ekgto285Vtg Accessed Sep. 15, 2011.

"Fun with a Car Horn vol. 1 Part 3." Video May 2008. http://www.youtube.com/watch?v=PA2tF0G02h0 Accessed Sep. 15, 2011.

"Fun with a Car Horn vol. 1 Part 2," Video May 2008. http://www.youtube.com/watch?v=uZymdklMd1M Accessed Sep. 15, 2011.

"Downhill bike with Car Horn-.alarm." Video Feb. 2009. http://www.youtube.com/watch?v=Rtq-vJ4Wurk Accessed Sep. 15, 2011.

"Fun with a car horn." Video May 2008. http://www.youtube.com/watch?v=K5jF9wS0Tm0 Accessed Sep. 15, 2011.

"Hamiltons best way to put a car horn on a bike!!" Video Nov. 2008. http://www.youtube.com/watch?v=PsuFhr67C9c Accessed Sep. 15, 2011.

"Car Horn on a Bike." Video Aug. 2010. http://www.youtube.com/user/hacktheplanet42?blend=22&ob=5#p/u/0/m6H2R1xx53E Accessed Sep. 15, 2011.

"car horn on my bicycle (better)." Video Mar. 2009. http://www.youtube.com/watch?v=Mg6Si2rLiks Accessed Sep. 15, 2011.

"Fun with a car horn 4." Video May 2008. http://www.youtube.com/watch?v=7n29aBad0Rc Accessed Sep. 15, 2011.

"Car horn mounted on bike." Video May 2011 http://www.youtube.com/watch?v=B2xsILHbN0 Accessed Sep. 15, 2011.

"Car Horn on a Bike (better)," Video Mar. 2009. http://www.youtube.com/watch?v=m6H2R1xx53E Accessed Sep. 15, 2011.

"Bicycle Car Horn Demo." Video Apr. 2011, http://www.youtube.com/watch?v=5iToBhMII4 Accessed Sep. 15, 2011.

"car horn on bike#3" Video Nov. 2008.http://www.youtube.com/watch?v=Y-14V5Z6ntM Accessed Sep. 15, 2011.

"Car Horn Bicycle Honking through Car wash." Video Sep. 2008. http://www.youtube.com/watch?v=3XW_WjiYBvo Accessed Sep. 15, 2011.

"car horn on my bike." Video Nov. 2008 http://www.youtube.com/watch?v=dG3rxAwBUVI Accessed Sep. 15, 2011.

"The Golf Course Car Horn," Video Nov. 2008. http://www.youtube.com/watch?v=fh1_NKgs3YM Accessed Sep. 15, 2011.

"My pimp bicycle now had a car stereo, along with other additions." Video Apr. 2010. http://www.youtube.com/watch?v=9o0CUwcLcJY Accessed Sep. 15, 2011.

"Car Horns on a Bike." Video May 2010 http://www.youtube.com/watch?v=6APeUHUOcA Accessed Sep. 15, 2011.

Sep. 15, 2011 web advertisement for Wolo Electric Horn Model 260. Wolo Manufacturing Corp. http://www.wolo-mfg.com/elec.htm Accessed Sep. 15, 2011.

Sep. 15, 2011 web advertisement for Wolo Electric Horn Model 260, additional graphic. Wolo Manufacturing Corp. http://www.wolo-mfg.com/250-21%20&%20260-2t-big.jpg Accessed Sep. 15, 2011.

Manta company profile for Wolo Manufacturing Corp. http://www.manta.com/c/mmf0hy9/wolo-manufacturing-corp Accessed Jan. 17, 2012.

"Traffic Droid Car Horns for bicycles Nov. 27, 2011" http://www.youtube.com/watch?v=OSEIIUFrlh0 Accessed Jan. 17, 2012.

"Traffic Droids Bicycle Car Horn Saturday Jan. 14, 2012" http://www.youtube.com/watch?v=_AIVXEqPgbE Accessed Jan. 17, 2012.

"BikeBell—Almost Real Bike Bell App for Symbian" http://www.youtube.com/watch?v=XA8ITP2ifNU (Use your phone like a real bike bell . . . included sounds . . . car horn . . . ) Accessed Jan. 17, 2012.

"My bike's Car Horn plus Auxiliary Air Horn with onboard compressor." Feb. 9, 2012. http://www.youtube.com/watch?v=J0HNsm65dX0 Accessed Dec. 15, 2012.

"Bicycle Lights and Horn sounds." Mar. 6, 2012. http://www.youtube.com/watch?v=mQ8Ur75e3HU Accessed Dec. 15, 2012.

"Wiring a car horn to your bike!" Mar. 10, 2012. http://www.youtube.com/watch?v=5jrueMekae0 Accessed Dec. 15, 2012.

"Bike horn." Apr. 19, 2012. http://www.make-something.com/?p=151 Accessed Dec. 15, 2012.

"Car horn on an electric bicycle." Jul. 12, 2012. http://www.bryanbracken.com/car-horn-on-an-electric-bicycle/ Accessed Dec. 15, 2012.

"Loud Bicycle: Car horn for your bike." Dec. 6, 1212. http://www.kickstarter.com/projects/lansey/loud-bicycle-car-horns-for-cyclists Accessed Dec. 15, 2012.

* cited by examiner

BICYCLE ELECTRONIC SIGNALING DEVICE THAT SOUNDS LIKE A CAR HORN

RELATED APPLICATION

This application claims the benefit of provisional patent Application No. 61/386,562 received Sep. 16, 2010.

FIELD

This application relates to a bicycle signaling device that uses light-weight batteries to generate the sound of a car horn.

PRIOR ART

This invention enables a bicycle rider for the first time to use a car horn powered by batteries no bigger than size AAA.

Prior art teaches away from this. For decades it has taught that any car horn requires batteries that are too heavy to be practical on a bicycle.

This is a new combination of the light-weight batteries and a car horn. It brings the unexpected and substantial benefits of working, working well and providing the first effective signaling device for biking in modern-day traffic.

From the time motor vehicles first joined bicycles on roads, cyclists have used various signaling devices to alert motorists. Motorists likewise needed to alert other motorists.

Warning motorists became increasingly difficult as drivers became more insulated by steel, glass, air conditioning and electronic distractions. For motor vehicles, a gasoline engine generating current to recharge a massive battery enabled ever-more effective electronic signaling devices, leading to the present car horn. (For example, see a 1910 car horn patent titled "Electric Signaling Device for Motor-cars. Cite No. 1.)

For bicycles, it was impractical to add a heavy car battery, so cyclists could not use the warning technology that motorists found most effective.

Prior art teaches that car horns require more current than small batteries can produce. They typical draw 5-6 amperes, with smaller ones drawing 2.5-5. (For example, see Wikipedia, Non-patent Cite No. 1.) Prior art also includes horns that use less than 1.5 amps and have been on the market for well over a decade. (See advertisement for horn in preferred embodiment online in 1997, Non-patent Cite No. 2.)

For batteries, prior art teaches that car horns can be powered by lead-acid batteries which are too heavy to be acceptable for use on bicycles. Prior art does include small batteries. The current produced by a small AAA alkaline battery is often stated as 1200 mAh. (For example, see Wikipedia, Non-patent Cite No. 3.) Prior art teaches that under a high load such as a car horn this can be reduced to an effective capacity of less than one-quarter of that. (For example, see Wikipedia and Radio Shack's On-line Battery Guidebook, Non-patent Cites No. 4, 5.) No one expected that these small batteries could power a car horn.

Cyclists have pooled their knowledge about this online for years without finding this solution. Typical is a topic last month on a bike forum: "I want a loud car horn on my bike." The only responsive answer was, "If you want to lug around a 7 lb battery, there are some compact 12 v horns that are extremely loud. (Non-patent Cite No. 6.)

For decades people have tried without success to make car horns work with various small batteries. Typical is an engineer working for Instructables.com who shows online the steps for, "Putting A Car Horn On Your Bicycle!" Initially it is powered by AA batteries, which are larger than the AAA batteries in the preferred embodiment. Seven months later he futilely asks for suggestions for batteries that would actually work. "An easy fix is using a lead acid but they are so heavy!" Other people tell him about other failures, such as, "I tried 8 size D batteries and all I got was a click. Also tried . . . 9-V . . . same thing." (Non-patent Cite No. 7. Similar: Non-patent Cites No. 10-15)

There are videos online showing how to put a car horn on a bike, but all appear to have been powered by heavy lead-acid batteries. The apparently most-watched video uses a 12 volt rechargeable drill battery. (Non-patent Cite No. 8. Similar: Non-patent Cites No. 16-48.)

Electric car horns were invented over a hundred years ago. (Cite No. 1.) Small AAA-size alkaline batteries were invented over fifty years ago. (Cite No. 2.) The horn model in the preferred embodiment has been on the market and on the web for more than 14 years. (Non-patent Cite No. 2.) During all those years, people failed to successfully combine these batteries and horns.

The prior art teaches away from combining these known elements. The results of combining these small batteries with this car horn were totally unexpected. Not only did the horn blare loudly, it could do so repeatedly.

This invention meets the long-felt but unsolved need for a bicycle device powered by small batteries that sounds like a car horn.

The car horn has a unique benefit to cyclists: Its distinctive sound is immediately recognized by most drivers as a top-priority warning of an imminent two-car crash. Drivers react to car horns more urgently than any other sound.

Also essential, a car horn is loud enough to penetrate motor vehicles and alert distracted motorists. None of the typical bicycle signaling devices—from bells to small squeeze horns to buzzers—can do this. Some are counterproductive, signaling the motorist that it is merely a small bicycle, not an oncoming motor vehicle.

(The few bicycle devices that are extremely loud, such as some whistles, large bulb squeeze horns and compressed-gas powered horns, have other major offsetting disadvantages. Examples: whistles are often illegal because police use them; horns louder than car horns damage hearing; squeeze horns take a hand away from steering and braking.)

The characteristics of a bicycle and cyclist are quite different from those of a motor vehicle and driver, requiring a quite different signaling device.

For the bicycle, to be effective and practical for biking in traffic a signaling device must meet all these criteria:
  It sounds like a car horn;
  It is not heavy;
  Any batteries:
    can produce many honks;
    work in cold and rain;
    hold their charge when not used;
    can typically be bought nearby;
  It is very loud, but not damaging to hearing;
  It is small.

This invention is the first to meet all these minimum requirements.

Prior art bicycle electronic signaling devices and horns produce sounds ranging from an unobtrusive pleasant sound to an attention-getting pulsating signal to a siren. (Cites No. 3, 4; Non-patent Cite No. 9.) None generate the sound of a car horn.

This invention empowers cyclists. Instead of feeling and being vulnerable when they see a car or truck about to turn into their path, they can move their thumb and blow a loud car horn to immediately get the full attention of the distracted driver. Cycling in traffic becomes safer and more comfortable.

SUMMARY OF THE INVENTION

My invention is a warning system on bicycles that sounds like a car horn, is about as loud as a car horn and can weigh less than a pound, with batteries.

The batteries are no bigger than size AAA. They produce many honks, work in cold and rain, store well, need no charging and can be bought almost everywhere.

It uses a car horn which has been sold for many years solely for motor vehicles.

The numbers of honks the batteries generate can be greatly increased by attaching the horn to a metal bracket which has a structure that reduces the electrical current needed to produce the sound.

This is done by tuning the resonance frequency of the bracket to the vibrating frequency of the horn. The structural characteristics of the bracket, such as thickness, length, springiness and number of bends, have been modified so that its vibrations are synchronized with the horn.

DRAWINGS

Figures

Figure 2:
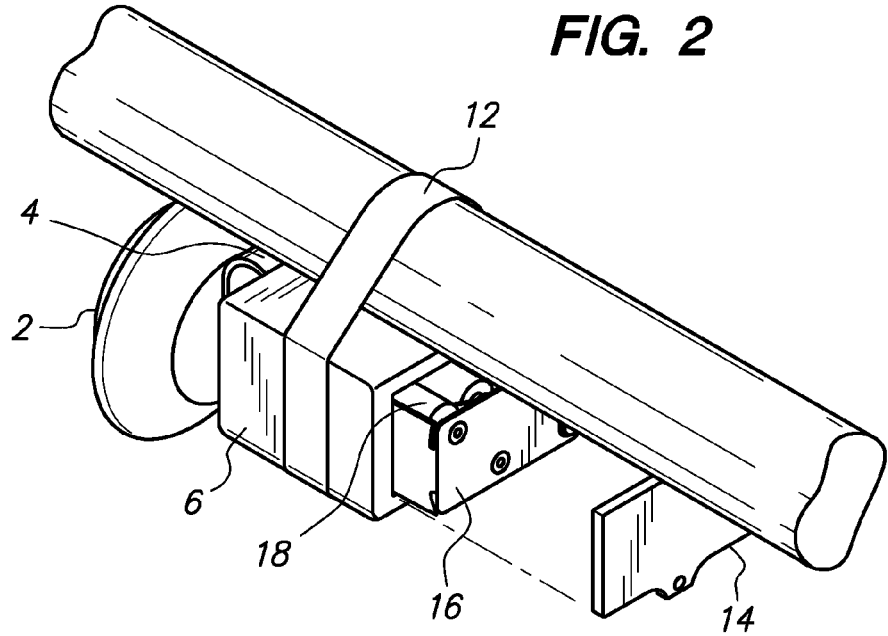
Figure 3:
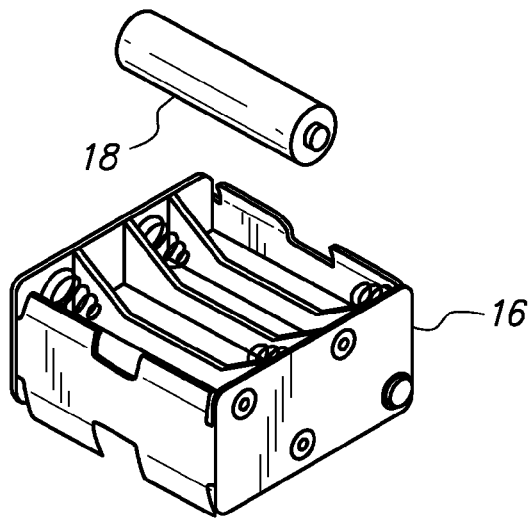
Figure 4:
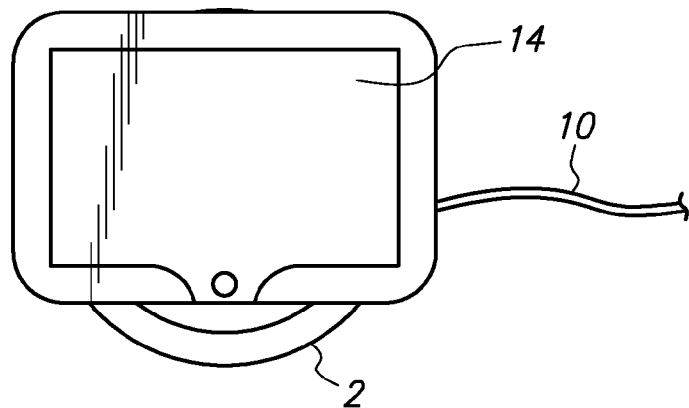
Figure 5:
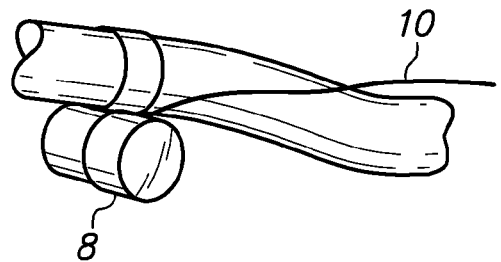
Figure 6:
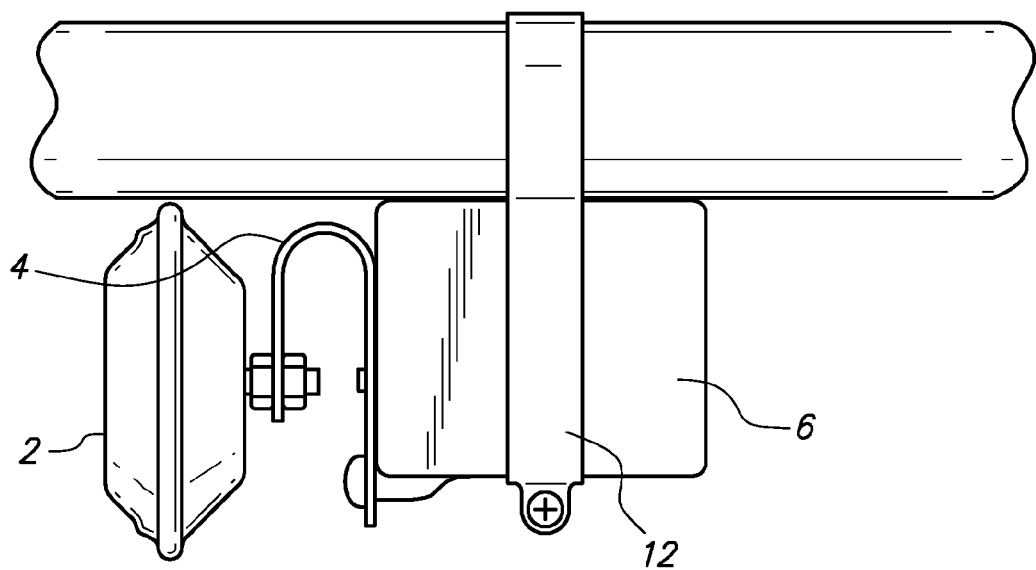

FIG. 1 Bicycle, switch, wire, horn, battery container
FIG. 2 Side view: horn, bracket, battery container, clamp, battery holder, batteries, lid
FIG. 3 Battery, battery holder
FIG. 4 Rear view: battery container, lid, horn
FIG. 5 Switch
FIG. 6 Side view: bracket

REFERENCE NUMBERS 2 horn
4 mount
6 battery container
8 switch
10 wire connecting batteries and switch
12 clamp
14 lid
16 battery holder
18 battery
50 bicycle

DESCRIPTION OF PREFERRED EMBODIMENT

Structure

The relationship between all the components of one embodiment of the device is illustrated by FIG. 1. The switch [8] and battery container [6] are attached to the bicycle [50] by clamps.

The switch is on the handlebars positioned so that it can be pushed by a thumb or finger at the same time the cyclist is steering the bike and applying any handbrakes. This enables the cyclist to take evasive action in an emergency without waiting to see if the oncoming motorist changes course in time.

The battery container is attached to the bike's top tube, positioned so that the attached horn [2] is pointed forward to best project sound toward oncoming traffic. The horn is at least 2.5 feet from the cyclist's ears to minimize potential hearing loss from the horn blasts. The horn is as loud as possible without exceeding the prudent safety limit of 110 decibels.

FIG. 2 shows a side view of the sound and battery components. They are firmly attached to the bicycle frame by a stainless steel hose clamp [12] around the battery container [6].

Within that container is the battery holder [16] positioning eight batteries [18]. The holder is shown partially extended, with the lid [14] separated.

The horn [2] is a 12 volt car disc horn, such as the Wolo Manufacturing Corp.'s Model 260-2T MidRange Black Finish, advertised as drawing less than 1.5 amps. and having a pitch of 480 HZ. (Non-patent Cite No. 49, 50.)

The horn is attached to the battery container by a metal bracket that is about 4 inches long and about ⅞ of an inch wide. It is curved as shown in FIG. 6. Its thickness and springiness have been selected so that its resonance frequency matches the vibrating frequency of the horn.

FIG. 3 shows one of the eight size AAA alkaline manganese dioxide batteries [18]. Each battery produces about 1.5 volts when fresh and weighs about 0.38 ounces. Its capacity is often stated as 1200 mAh, but its effective capacity with a car horn is much lower.

They are held in the battery holder [16]. This holds eight batteries and wires them in series to snap connectors. This is Eagle Plastic Devices' part #12BH483B-GR. That connector snaps to a two-strand 18 gauge insulated wire [FIGS. 4, 5: 10] which runs to the switch [FIG. 5: 8].

That switch is a durable momentary, normally-open pushbutton.

Alternative Embodiments

The claims cover many embodiments, including the following examples.

Different small, light, disposable battery types.
Different horns.
More than one pushbutton mounted on the handlebar so that they can be reached more easily from different hand positions.
Various designs of pushbuttons so that they can be more visible or pushed with different fingers or while simultaneously using handbrakes and/or steering.
Mounting the horn and battery container separately on the bicycle.
Mounting the horn and/or battery container in other places, including the seat, handlebars, at the front of the bike or in a cargo box.

Ramifications

Biking in traffic is scary and dangerous. Bikes are narrow and hard to see. Motor vehicle drivers focus on approaching cars and truck, constantly choosing lanes and routes. They are often distracted and can't hear oncoming bicycles.

This invention finally gives cyclists the same audio warning capability that has proved most successful on motor vehicles.

Since many people would like to bike on roads but are primarily deterred by the scary traffic, this will make more people feel comfortable biking in traffic.

Besides reducing bicycle crashes and increasing goodwill between cyclists and motorists, this will help more people to cycle more often in their neighborhood and beyond—improving their spirits and health, while saving them money and reducing global climate change, air pollution, traffic congestion, oil consumption and parking problems.

The invention claimed is:

1. A bicycle electronic signaling device comprising:
   (a) a bicycle;
   (b) a sound generation means
      (i) drawing not substantially more than 2 ampere-hours at 12 volts;
      (ii) producing substantially the sound of a car horn with pitch within the range of approximately 340 to 500 hertz and loudness within the range of approximately 107 to 112 decibels;
   (c) a plurality of batteries, each battery not substantially bigger than size AAA, and each battery having an effective amperage being substantially less than the rated current output of 1.2 ampere-hours when connected to said sound generation means;
   (d) at least one switch for controlling the flow of current from said plurality of batteries to said sound generation means; and
   (e) one or more clamps or fasteners attaching said switch and other components of said device to said bicycle;
   wherein said sound generation means is attached to said bicycle or other components of said device by a bracket whose resonance frequency is tuned to substantially match the vibrating frequency of said sound generation means.

2. The bicycle electronic signaling device of claim 1, wherein said bracket is formed from metal.

3. The bicycle electronic signaling device of claim 1, further comprising a battery container sized to accommodate said plurality of batteries, said battery container coupled to said sound generation means.

4. The bicycle electronic signaling device of claim 3, wherein said battery container has a first side and a second side, said first side being disposed opposite to said second side, said sound generation means being coupled to said first side of said battery container, and said second side of said battery container having a lid mounted thereon for gaining access to said plurality of batteries.

5. The bicycle electronic signaling device of claim 3, further comprising a battery holder removably received in said battery container for holding said plurality of batteries.

6. The bicycle electronic signaling device of claim 5, wherein said battery container further comprises a lid, at least a portion of said lid being detachable from said battery container so as to allow said battery holder to be removed from said battery container.

7. The bicycle electronic signaling device of claim 1, wherein said at least one switch is a momentary pushbutton normally-open switch.

8. A bicycle electronic signaling device comprising:
   (a) a bicycle;
   (b) a sound generation means
      (i) drawing not substantially more than 2 ampere-hours at 12 volts;
      (ii) producing substantially the sound of a car horn with pitch within the range of approximately 340 to 500 hertz and loudness within the range of approximately 107 to 112 decibels;
   (c) a plurality of size AAA batteries, each of said plurality of size AAA batteries having an effective amperage being substantially less than the rated current output of 1.2 ampere-hours when connected to said sound generation means;
   (d) a battery container sized to accommodate said plurality of size AAA batteries, said battery container coupled to said sound generation means;
   (e) at least one momentary pushbutton normally open switch for controlling the flow of current from said plurality of size AAA batteries to said sound generation means; and
   (f) one or more clamps or fasteners attaching said switch and other components of said device to said bicycle, wherein said sound generation means is coupled to said battery container by means of a U-shaped bracket, said U-shaped bracket having a resonance frequency that is tuned to substantially match the vibrating frequency of said sound generation means.

9. The bicycle electronic signaling device of claim 8, wherein said battery container has a first side and a second side, said first side being disposed opposite to said second side, said U-shaped bracket being attached to said first side of said battery container, and said second side of said battery container having a lid mounted thereon for gaining access to said plurality of size AAA batteries.

10. The bicycle electronic signaling device of claim 8, further comprising a battery holder removably received in said battery container for holding said plurality of size AAA batteries.

11. The bicycle electronic signaling device of claim 10, wherein said battery container further comprises a lid, at least a portion of said lid being detachable from said battery container so as to allow said battery holder to be removed from said battery container.

12. A bicycle electronic signaling device comprising:
   (a) a bicycle;
   (b) a sound generation means
      (i) drawing not substantially more than 2 ampere-hours at 12 volts;
      (ii) producing substantially the sound of a car horn with pitch within the range of approximately 340 to 500 hertz and loudness within the range of approximately 107 to 112 decibels;
   (c) a plurality of size AAA batteries, each of said plurality of size AAA batteries having an effective amperage being substantially less than the rated current output of 1.2 ampere-hours when connected to said sound generation means;
   (d) a battery container having a first side and a second side oppositely disposed with respect to said first side, said battery container sized to accommodate said plurality of size AAA batteries, said second side of said battery container having a removable lid disposed thereon for gaining access to said plurality of batteries;
   (e) a U-shaped bracket coupling said sound generation means to said battery container, said U-shaped bracket being attached to said first side of said battery container;
   (f) at least one switch for controlling the flow of current from said plurality of batteries to said sound generation means; and
   (g) one or more clamps or fasteners attaching said switch and other components of said device to said bicycle;
   wherein said U-shaped bracket has a resonance frequency that is tuned to substantially match the vibrating frequency of said sound generation means.

13. The bicycle electronic signaling device of claim 12, wherein said U-shaped bracket is formed from metal.

14. The bicycle electronic signaling device of claim 12, further comprising a battery holder removably received in said battery container for holding said plurality of size AAA batteries.

15. The bicycle electronic signaling device of claim 12, wherein said at least one switch is a momentary pushbutton normally-open switch.

\* \* \* \* \*